UNITED STATES PATENT OFFICE 2,361,137

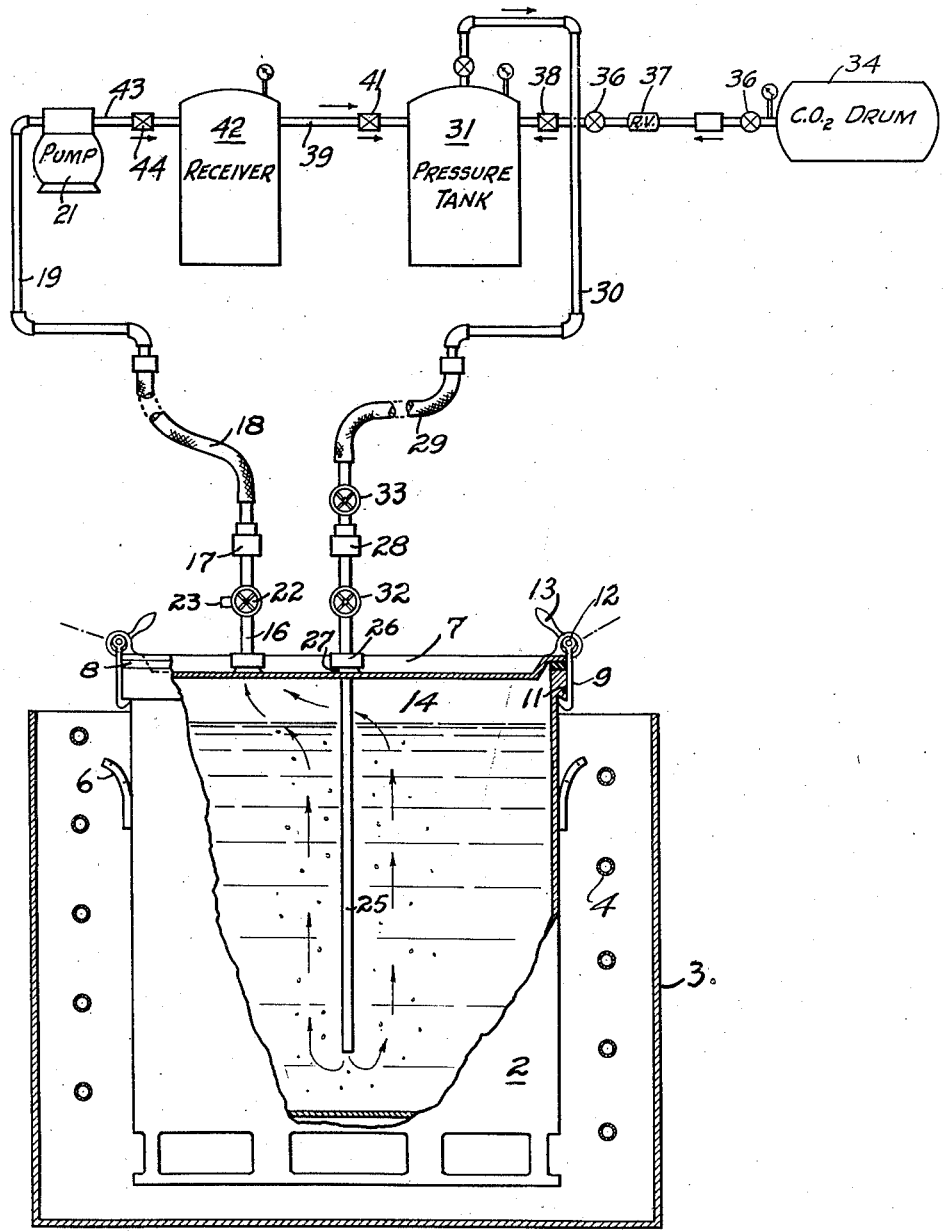

APPARATUS FOR PRODUCING ICE CHARGED WITH CO₂ GAS

Kenneth F. Terry, San Francisco, and James J. Imperatrice, Fresno, Calif.

Application September 24, 1941, Serial No. 412,122

1 Claim. (Cl. 261—11)

Our invention relates to the freezing of water, and one of the broad objects of the invention is to provide a method and means of incorporating carbon dioxide gas in the freezing water, so that the resultant ice will release the gas as the ice melts.

Another object is the provision of an improved method and means of making ice of superior quality.

Other objects of the invention together with the foregoing will be set forth in the following description of the preferred process and the means for practicing the same, which is illustrated in the drawing accompanying and forming part of the specification. It is to be understood that we do not limit ourselves to the showing made by the said descriptions and drawing, as we may adopt variations of the preferred forms within the scope of the invention as set forth in the claim.

In the drawing, the figure is a diagrammatic elevation of the apparatus which we have used to practice our invention. The freezing unit is shown in vertical section and on a scale considerably larger than the rest of the apparatus.

The use of charged water and soft drinks, as well as drinks not so soft, to which escaping carbon dioxide gas bubbles lend sparkle and charm, is too common to need more than passing reference, as one of the desirable, if not essential features of contemporary living. Except by the use of charged water, there is no practical way of quickly carbonating a freshly made drink.

Since the use of ice is a necessary part in the compounding of most beverages, especially those of alcoholic content, it is one of the broad purposes of our inventive effort to provide in the ice itself the charging gas by which the mixture is enlivened, without recourse to the siphon, which surrounded with hallowed memories as it may be, must perforce give way to the advance of progress. Whether or not a siphon is used, the gas released from the melting ice tends to compensate for the dilution of the liquid caused by the melting ice.

The storage and shipment of fruits and other foodstuffs is also characteristic of our modern times. Here also, the use of ice as a refrigerant material is widespread. The quality of foods kept in the atmosphere in which there is free oxygen frequently suffers. We contemplate the use of ice in such cases, which releases carbon dioxide gas as it melts to replace the natural air in the refrigerating chamber, and thus retard or inhibit degenerative changes in the refrigerated material which are caused by or are dependent on free oxygen.

With specific reference to the drawing, our method and an apparatus for its practice will be understood from the following description of a single freezing unit. It will of course be understood that a multiple arrangement of such units may be devised for increased production.

A freezing can 2 of any desired dimensions, but conveniently one in which a three hundred pound cake of ice may be formed, is disposed in a tank 3 containing brine cooled by the refrigerating coils 4 arranged and operated in accordance with usual practice in the production of ice. The can is provided with oppositely disposed ears 6 for ready attaching to the hoist commonly used to lift the freezing cans from the refrigerant tank.

A cover 7 provided with a gasket 8, tightly closes the top of the can. The cover is releasably held on the can by any suitable means such as two or more hook-like clamps 9, latched at one end under the can flange 11, and at the other end pivoted on the pin 12, eccentrically mounted on the cylindrical hub of the handle 13. By moving the handles outwardly to the positions indicated by the dotted lines, the clamps are loosened so that the cover may be removed.

Fixed in the cover 7 and opening into the chamber 14 under the cover at the top of the freezing can, is a short pipe 16, provided with a quick release coupling 17 for connecting the pipe to the flexible conduit or hose 18, which is fixed at its other end to the pipe 19, connected into the exhaust pump 21. A two-way valve 22, permits flow from the chamber 14 to the pump, or to the atmosphere through the vent 23, or closes egress from the chamber.

A charging tube 25 is releasably fixed on the cover 7, by the coupling ring 26 threaded on to the nipple 27 fixed to the cover, and extends well down into the freezing can along its central longitudinal axis. The tube extends a short distance on the outside of the cover and is provided with a quick release coupling 28 for connection with the flexible conduit or hose 29, connected at its other end with the pipe 30, which in turn is connected into the pressure tank 31. The tank is adapted to hold carbon dioxide gas at a convenient working pressure. A valve 32 in the tube 26, and a valve 33 in the conduit 29, control the flow of fluid through the conduit and charging tube.

The pressure tank is connected with a supply drum 34 of the gas under high pressure, through a pipe in which suitable shut-off valves 36, reducing valve 37, and check valve 38, facilitate the transfer of the gas.

The pressure tank is also connected through the pipe 39, controlled by the check valve 41, with the receiver 42, in turn connected through the pipe 43, controlled by the check valve 44, with the pump 21, driven by any convenient prime mover, not shown.

The reducing valve 37 is adjusted to maintain the gas in the pressure tank at a maximum of sixty-five pounds pressure; and the check valve 41 is arranged to permit the receiver to discharge into the pressure tank when the receiver pressure rises above that amount.

With the can 2 filled with treated and softened water in accordance with the usual practice in making ice, and the refrigerator coils 4 in operation, the cover 7 is seated on the can, and held by the manually operated hook-clamps 9, with the annular gasket 8 in tight engagement with the rim of the can, so that no leakage through this joint can occur. The flexible conduits 18 and 29 are then connected as shown, by the couplings 17 and 28. The valve 22 is turned to open the vent 23, and close the conduit 18, and the valves 32 and 33 are opened to permit a flow of carbon dioxide gas to pass out the bottom of the charging tube 25 and bubble up through the chilling water.

The freezing water in the can is agitated by the rising gas bubbles much of which is absorbed by it. The gas that emerges at the surface displaces the air there which quickly exhausts into the atmosphere through the vent. The valve 22 is then turned to direct the carbon dioxide gas into the conduit 18, from which it is taken by the pump 21 and forced into the receiver, and thence to the pressure tank for another circuit through the freezing can when the relative pressures in the two receptacles permit. After working conditions have been established, gas from the supply drum flows to the pressure tank only as the freezing water absorbs the gas and thus reduces the quantity in the circuit.

The introduction of the gas near the bottom of the cans agitates the water and tends to prevent the inclusion of any suspended matter in the ice, which builds out from the sides toward the center of the can around the charging tube. This concentrates impurities in the core in a manner familiar to the ice manufacturer; and where the water fails of perfect condition in this regard, the dirty core may be pumped out, replaced by clean water and the freezing of the cake completed in the usual manner.

Where the condition of the water permits, the charging tube is withdrawn at the last moment and the core water permitted to freeze. This may be done by taking off the entire cover structure including the charging tube; and handling the open top can in the same way as the ordinary freezing can is handled. In some cases, it may be desirable to protect the ice in the can from contamination by leaving the cover on until the cake is ready to be removed. This is accomplished by closing the valve 22 and disconnecting the coupling 17; and then withdrawing the charging tube by loosening the coupling ring 26 and threading over the nipple a suitable cap.

After freezing is completed, the cake is removed in the manner usual in ice making plants. The ice is used for cooling just as ordinary ice is used, but its characteristic of releasing carbon dioxide gas as it melts widens the field of its application both in the home and commercially.

Thus the introduction of carbon dioxide gas serves a dual purpose. While it is being absorbed and entrained in the water, it also agitates it and thus aids its purification and even freezing. The value of ice made in accordance with our invention in the making and carbonating of beverages is believed to be only a small part of its value in the refrigeration of food in transit and storage, not only because the melting ice liberates the gas to replace the air in the refrigerated chamber but because the gas is in itself a preservative, and tends to prevent the development of destructive organisms.

We claim:

An apparatus for charging freezing water with $CO_2$ gas comprising a receptacle adapted to hold water which is to be frozen, a cover plate for said receptacle, a charging tube disposed in said cover and having its inner end terminating adjacent the bottom of the receptacle, a pressure tank connected to the outer end of said tube, a pump discharging into said pressure tank, a conduit connecting the intake side of the pump to the inside of said cover plate, means for connecting the pressure tank to a drum of $CO_2$, a reduction valve between the tank and drum, and a loaded valve between the pump and tank.

KENNETH F. TERRY.
JAMES J. IMPERATRICE.